3 Sheets--Sheet 3.
B. A. OLIVER.
Excavators.
No. 136,936. Patented March 18, 1873.
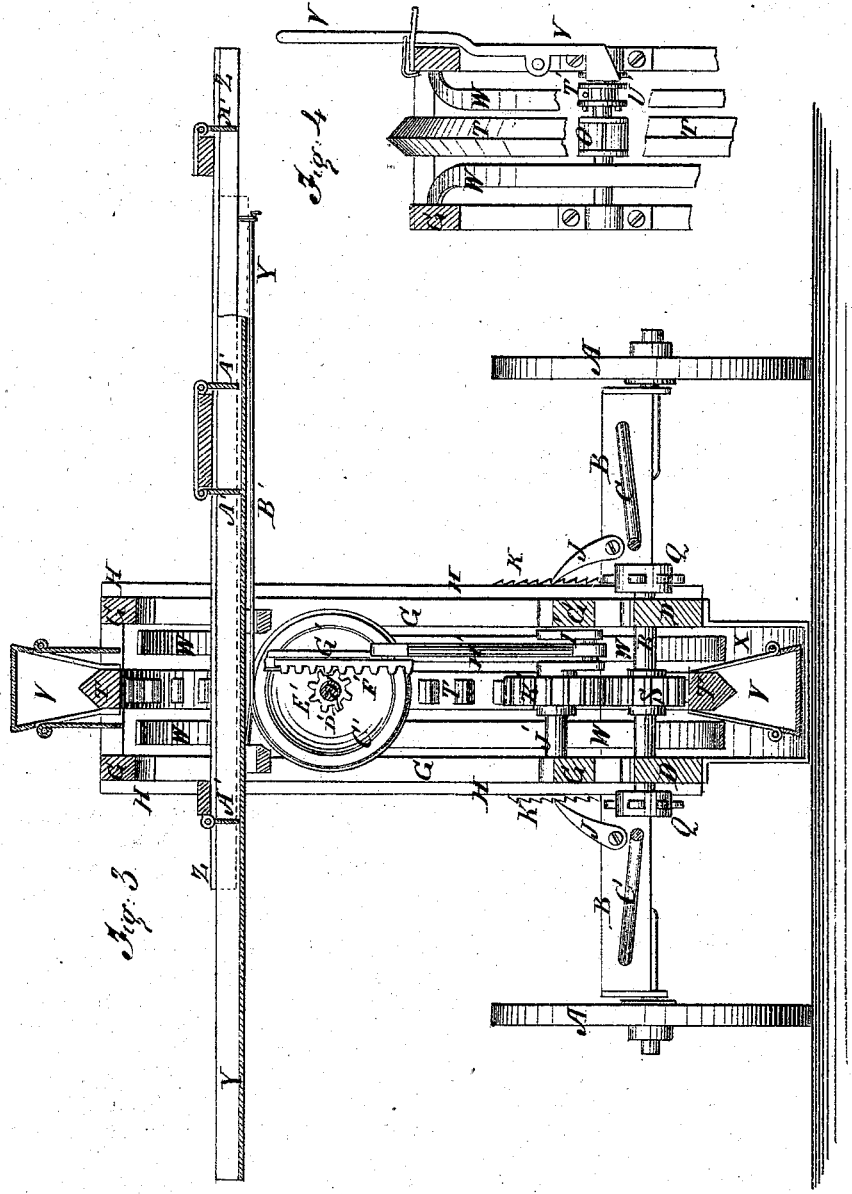
Witnesses:
Chas. Nida
C. Sedgwick
Inventor:
B. A. Oliver
per Munn & Co.
Attorneys.

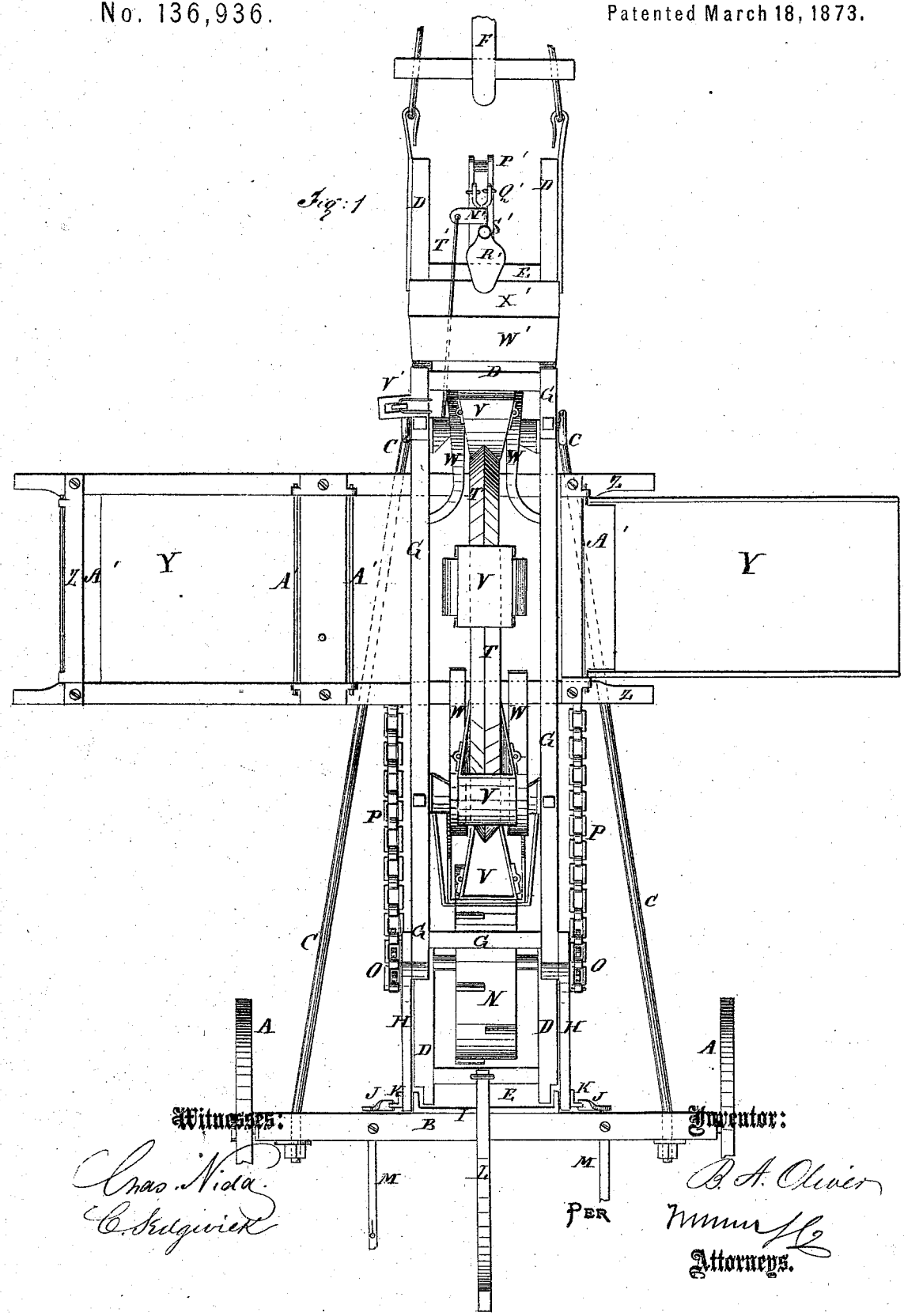

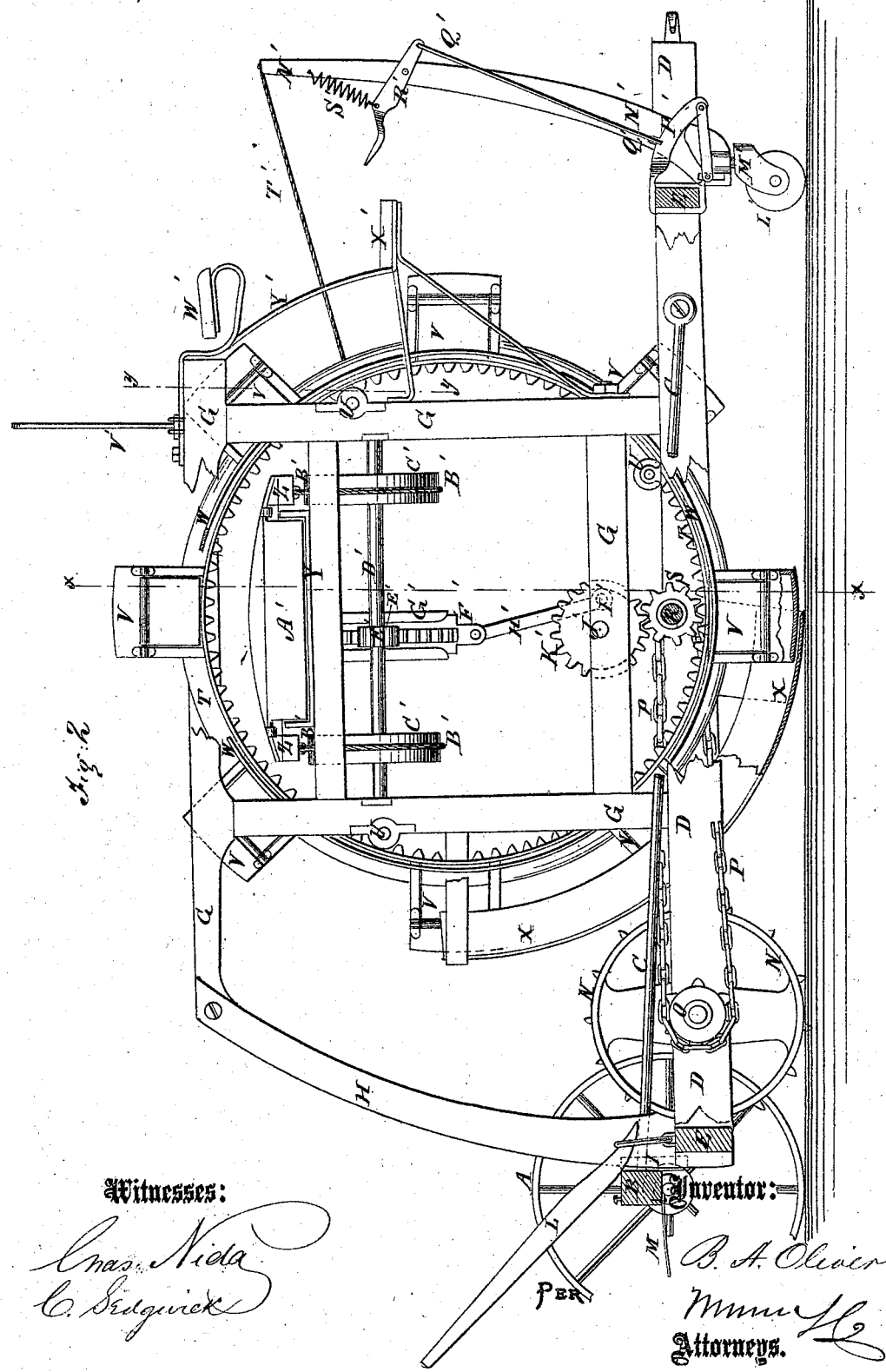

UNITED STATES PATENT OFFICE.

BENJAMIN A. OLIVER, OF BUNKER HILL, ILLINOIS, ASSIGNOR TO HIMSELF AND A. M. COX, OF SAME PLACE.

IMPROVEMENT IN EXCAVATORS.

Specification forming part of Letters Patent No. 136,936, dated March 18, 1873.

*To all whom it may concern:*

Be it known that I, BENJAMIN A. OLIVER, of Bunker Hill, in the county of Macoupin and State of Illinois, have invented a new and useful Improvement in Grading and Ditching-Machine, of which the following is a specification:

Figure 1, Sheet I, is a top view of my improved machine. Fig. 2, Sheet II, is a side view of the same, parts being broken away to show the construction. Fig. 3, Sheet III, is a detail vertical cross-section of the same taken through the line $x\ x$, Fig. 2. Fig. 4, Sheet III, is a detail sectional view of the same taken through the line $y\ y$, Fig. 2.

Similar letters of reference indicate corresponding parts.

My invention has for its object to furnish an improved machine for ditching, grading, &c., which shall be simple in construction, convenient in use, and effective in operation; raising the dirt from the bottom of the cut and depositing it upon the ground at the side or sides of the ditch; and it consists in the construction and combination of the various parts of the machine, as hereinafter more fully described.

A are the wheels, which are designed to run upon the surface of the ground at the sides of the ditch, and which revolve upon the journals of the axle B. To the axle B, near its ends, are attached the rear ends of two rods, C, which incline inward, and the forward ends of which are pivoted to the sides of the forward parts of the bars or beams D, which are connected at or near their front and rear ends by cross-bars E, and to the forward ends of which is attached the tongue F, to which the draft is applied. To the middle part of the bars D is attached an upright frame, G. To the rear ends of the top bars of the frame G are attached the upper ends of the bars H, which are curved upon the arc of a circle having its center at the pivoting point of the rods C, and the lower ends of which are attached to the rear ends of the beams D so that the said curved bars H may move up and down along the forward side of the axle B, where they are kept from lateral movement by the bar or plate I, attached to the forward side of the axle B, and which has flanges formed upon its ends, which rest against the inner sides of the curved bars H. The rear part of the machine is supported, when raised for passing from place to place, by two pawls, J, pivoted to the forward side of the axle B, and which take hold of the teeth of the ratchet-bars K attached to the outer sides of the lower parts of the curved bars H. The rear part of the machine is raised and lowered by means of a lever, L, the forward end of which is inserted in a ring or other loop or device attached to the rear cross-bar E, the lever L resting upon the axle B as a fulcrum. The lever L when not use is placed in leather or other loops or supports M, attached to the rear side of the axle B. N is the drive-wheel, which rolls along the bottom of the cut, and its face is toothed or roughened to prevent it from slipping. The journals of the wheel N revolve in bearings attached to the beams D, and to their outer ends are attached small chain-wheels O, around which passes the endless chain P, which also passes around the chain-wheels Q attached to the ends of the shaft R. The shaft R revolves in bearings attached to the beams D, and to its center is attached a gear-wheel, S, the teeth of which mesh into the teeth formed upon the inner surface of the rim or ring T, which is held in place by and moves upon three or more supporting and guide rollers, U, pivoted to the frame G, and which are grooved and toothed to receive the teeth of the said ring or rim. The rim or ring T is made inclined or V-shaped upon its outer side to allow the dirt to slide from it freely. To the side edges of the rim or ring T are attached boxes or scoops V, the rear ends of which are made close and their forward ends open. The lower parts of the sides of the boxes V are loose, and are hinged at their outer edges to the edges of the stationary parts of said sides, thus forming doors, which when closed confine the contents of the boxes, and when opened allow said contents to drop out. As the boxes V pass the top of the machine the doors of the boxes V strike against the ends of the guides W, by which they are closed and held closed until said boxes reach the other ends of said guides as they again come to the top of the machine. The guides W are attached to and are supported by the frame G, and their forward ends are made inclined or curved, as shown in Fig. 1, so as to gradually close the doors of the boxes V. The other ends of the guides W terminate abruptly, as shown in Fig. 1, so as to release the doors promptly and allow the dirt to drop out as soon as the boxes have reached the discharging-point or top of the machine. X is the stationary scoop by which the dirt is taken from the ground, and which is securely attached to the frame-work D G of the machine. The scoop X is made upon the arc of a circle, and its channel is made of such a size as to receive and fit upon the boxes V, which in passing through said scoop X take the dirt raised from the ground by it, carry the dirt to the top of the machine, and discharge it into the trough or spout Y, which is secured to the upper part of the frame G, and which is made of such a length that the dirt may be discharged from its ends at a suitable distance from the ditch. Z is a sliding frame, consisting of two side bars placed at the opposite sides of the trough or spout Y, and connected by three or more cross-bars crossing the top of said trough.

To the outer side edges of the cross-bars of the sliding frame Z, and to both the side edges of its central cross-bar, are hinged or pivoted plates or valves A', two of which, when the frame Z is moving in either direction, rest against the edges of the cross-bars and push the dirt that may be in the trough Y from the end of said trough, while the other two swing outward and slide over the dirt ready to push it from the outer end of the trough Y, upon the return movement of the frame Z. By turning up one pair of the valves A', the machine may be made to discharge all the dirt at one side of the ditch.

If desired, the boxes V, instead of being made with side doors, may be made with sliding bottoms, which, as the said boxes come to the top of the machine, are drawn out to discharge the dirt by a pin attached to the central cross-bar of the frame Z, as the said frame slides back and forth, and which are again pushed back into place as the boxes move on.

To the side bars of the sliding frame Z, near their ends, are attached the ends of two cords, B', which pass around the wheels C', attached to the shaft D', so that the frame Z may be slid back and forth by the reciprocating movement of the said shaft D'. The shaft D' revolves in bearings attached to the frame G, and to its middle part is attached a small gear-wheel, E', the teeth of which mesh into the teeth of a rack-bar, F', which slides up and down in a way or guide, G', attached to the frame G. To the lower end of the toothed bar F' is pivoted the upper end of the connecting-rod H', the lower end of which is pivoted to the crank I', formed upon the shaft J', which revolves in bearings attached to the frame G, and has a gear-wheel, K', attached to it, the teeth of which mesh into the teeth of the gear-wheel S that drives the rim or ring T. The forward end of the machine is supported by a pair of small wheels, L', pivoted to a short shaft at such a distance apart as to run in the ditch, and at the same time not to pack the ridge of loose earth raised in the middle part of the cut by the plows. The standard M' of the wheels L' is pivoted to the lower end of the lever N', which is pivoted to the bracket P', attached to the forward cross-bar E, and in the upper part of which is formed a notch or notches to receive the catch formed upon the lower end of the rod Q', which extends up along the lever N', and its upper end is pivoted to the end of a short foot-lever, R', pivoted to the side of the upper part of the lever N' in such a position that the driver may conveniently operate it with his foot to detach the catch Q'. The catch Q' is held to its place by a spring, S', one end of which is attached to the lever N', and its other end to the foot-lever R'. To the upper end of the lever N' is attached one end of a cord or chain, T', the other end of which is attached to a small drum, U', riding upon the shaft of the forward guide-roller U. V' is a lever pivoted to the frame G, the lower end of which is connected with the drum U'. The upper end of the lever V' extends up into such a position that the driver from his seat can operate the said lever to throw the drum U' into gear with the guide U, so that the advance of the machine may wind up the cord T', and thus raise the forward end of the machine. To the upper forward part of the frame G is attached the driver's seat W'. To the front of the frame G is also attached a board or rest, X', for the driver's feet. Y' is an apron to protect the driver's legs from being struck by the dirt-boxes V as they are carried around.

Having thus described my invention, I claim as new and desire to secure by Letters Patent—

1. The arrangement of the wheels A and axle B, bars C, and frame D E G H with each other, substantially as herein shown and described, to adapt the working parts of the machine to be raised and lowered, as and for the purpose set forth.

2. The combination of the rack-bars K and pawls J with the axle B and curved bars H of the frame-work D E G H, substantially as herein shown and described, and for the purpose set forth.

3. The toothed rim or ring T, guide-rollers U, dirt-boxes V, whether made with movable sides or bottoms, and the stationary scoop X, in combination with the frame-work D E G H, substantially as herein shown and described, and for the purpose set forth.

4. The combination of the driving-wheel N, chain-wheel O Q, endless chain P, and gear-wheel S with the toothed rim or ring T that carries the dirt-boxes V, and with the frame-work D E G H, substantially as herein shown and described, and for the purpose set forth.

5. The combination of the stationary guide W with the dirt-boxes V, toothed rim or ring T, and frame-work D E G H, substantially as herein shown and described, and for the purpose set forth.

6. The stationary trough Y and sliding frame Z, provided with hinged valves or plates A', in combination with the toothed rim or ring T, dirt-boxes V, and frame-work D E G H, substantially as herein shown and described, and for the purpose set forth.

7. The combination of the caster-wheels L', standard M', pivoted lever N', and spring-catch Q' R' S' with the forward end of the frame-work D E G H, that carries the operating parts of the machine, substantially as herein shown and described, and for the purpose set forth.

8. The combination of the cord T', sliding clutch-drum U', and lever V' with the lever N', and with one of the guides that carry the toothed rim or ring T, substantially as herein shown and described, and for the purpose set forth.

9. The combination of the cords B', wheels C', gear-wheel E', toothed rack F', connecting-rod H', crank I', and gear-wheel K' with the gear-wheel S, that drives the toothed rim or ring T, and with the sliding frame Z A', substantially as herein shown and described, and for the purpose set forth.

BENJAMIN A. OLIVER.

Witnesses:
F. W. CROSS,
A. N. YANCEY.